INVENTOR.
Cornelius D. Dosker

Oct. 4, 1960 C. D. DOSKER 2,954,892
VESSEL FOR STORING COLD LIQUIDS
Filed July 9, 1958 3 Sheets-Sheet 2
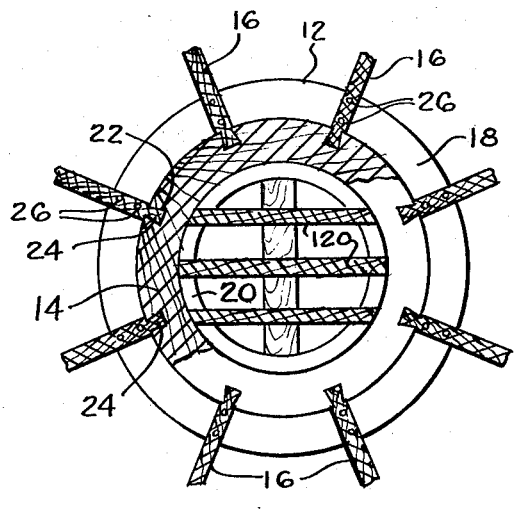
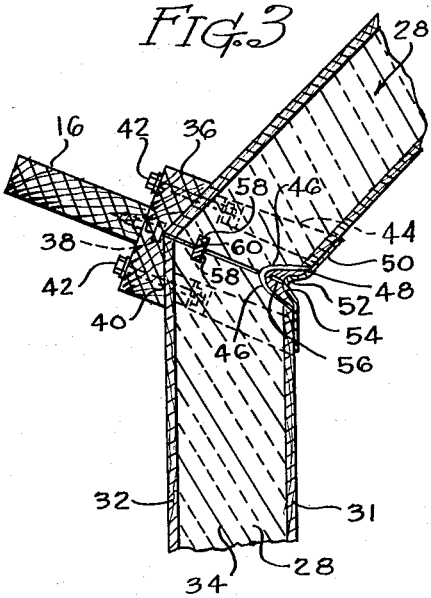
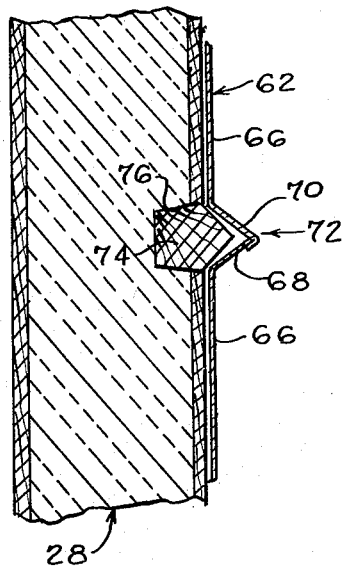
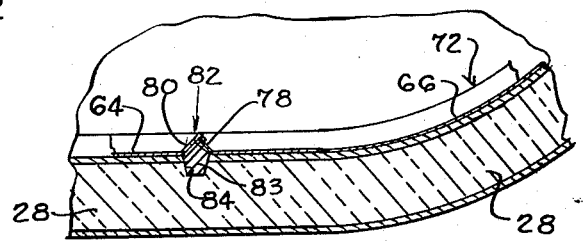
INVENTOR.
Cornelius D. Dosker
BY
Ooms, McDougall, Williams, & Hersh
Attorneys Oct. 4, 1960

C. D. DOSKER 2,954,892

VESSEL FOR STORING COLD LIQUIDS

Filed July 9, 1958

INVENTOR.
Cornelius D. Dosker
BY
Ooms, McDougall, Williams & Hersh
Attorneys

United States Patent Office 2,954,892
Patented Oct. 4, 1960

2,954,892

VESSEL FOR STORING COLD LIQUIDS

Cornelius D. Dosker, Louisville, Ky., assignor, by mesne assignments, to Conch International Methane Limited, a corporation of the Bahamas Filed July 9, 1958, Ser. No. 747,418

14 Claims. (Cl. 220—11)

This invention relates, as indicated, to improvements in vessels used for storing cold liquids, either in a fixed locality or during transportation of the cold liquids, and more particularly, but not by way of limitation, to an improved vessel for storing and transporting liquefied natural gas.

Natural gas is merely representative of a material which is capable of liquefaction and which is available in excess supply in certain areas while being deficient in many others. In such instances, it is desirable to effect distribution of the gas by transportation of the gas from the area of plentiful supply to the area where a deficiency exists. Where the areas are connected by land, the gas can be made available by transmission in a gaseous state through a suitable pipeline. However, when the areas are separated by a large body of water, or where the areas are substantially isolated one from the other by large stretches of land, pipeline transmission becomes impractical.

Considerable effort has been expended in the search for suitable means for the transmission of the gas other than by pipeline. It is known that the gas could be housed in suitable tanks for transportation from the source of plentiful supply to the area where a deficiency exists, but the volume of gas capable of being transmitted by such means is so limited as to render the system impracticable. It is known that a gas is reduced in volume in the ratio of 1/600 when converted from a gaseous state to a liquefied state at equivalent pressure. Thus, more efficient utilization can be made of the space available when the gas is transported in a liquefied state, such that it becomes practical to liquefy the gas at the source of plentiful supply for transportation in a liquefied state to areas where a deficiency exists, where the liquefied gas can be reconverted to the gaseous state for use.

For practical operation, it is desirable to provide for storage and transportation of the liquefied gas in large volume and in tanks of large capacity. This limits the operation to storage and transportation in structures maintained at about atmospheric pressure or preferably slightly above. Methane, which represents the principal component of natural gas, has a bubble point or critical vaporization point at about —258° F. at atmospheric pressure. Thus, liquefied natural gas, which is representative of one of the gases capable of liquefaction and transportation in accordance with the practice of this invention, will have to be maintained at a temperature below about —240° F., depending upon the amount of heavier hydrocarbons in the gas.

Maintenance of the liquefied gas at such extremely low temperature presents a number of problems from the standpoint of the materials employed and the insulation to prevent heat loss which otherwise would cause excessive vaporization of the liquefied gas.

The present invention contemplates a novel storage vessel having a framework comprising upper and lower rings interconnected by arcuate ribs in such a manner that the framework may be transported disassembled, assembled in sections on the ground, and then erected at the desired location. The upper and lower rings and the ribs are preferably formed out of wood to provide a strong yet light-weight framework. Wooden insulation panels are secured around the inner periphery of the framework to provide a sealed and insulated storage chamber wherein the inner surface of the insulation forming the storage chamber will maintain its shape through repeated temperature changes. A relatively thin gas and liquid-impervious lining is provided around the bottom and up the sides of the storage chamber to receive the cold liquid. The lining is supported in the storage chamber for contraction and expansion independently of the insulation. The present invention also contemplates a novel supporting structure for preventing collapse of the lining when liquid is removed from the vessel and yet permits substantially free contraction of the lining when the vessel is filled with a cold liquid.

An important object of this invention is to provide a light-weight and economical vessel for storing cold liquids.

Another object of this invention is to provide a vessel for storing cold liquids having the maximum movability of parts to facilitate erection of the vessel in a remote location.

Another object of this invention is to provide a storage vessel wherein a minimum amount of cold liquid stored in the vessel will be evaporated.

A further object of this invention is to provide a vessel for storing cold liquids having an insulated storage chamber and a gas and liquid-impervious lining or envelope in the storage chamber, wherein the lining is free to expand and contract independently of the insulation.

Another object of this invention is to provide a novel lining for the storage chamber of a vessel used for storing cold liquids, wherein the lining will remain centered in the storage chamber and yet may expand and contract independently of the walls of the storage chamber.

A still further object of this invention is to provide a novel supporting structure for preventing collapse of the lining in the storage chamber of a vessel used for storing cold liquids.

Other objects and advantages of the invention will be evident from the following detailed description, when read in conjunction with the accompanying drawings which schematically illustrate my invention.

In the drawings:

Figure 2 is a sectional view as taken along lines 2—2 of Fig. 1;

Figure 3 is a typical sectional view through the vertical walls of the vessel as taken along lines 3—3 of Fig. 1;

Figure 4 is a detailed sectional view as taken substantially along lines 4—4 of Fig. 1 to illustrate the construction of the vertical wall portion of the lining of a vessel, along with the means used for preventing the lining from creeping circumferentially in the vessel;

Figure 5 is a detailed vertical sectional view through the lower portion of the vessel illustrated in Fig. 1 showing the construction of the lower portion of the lining and the means used for retaining the lining centered in the storage chamber;

Figure 1:
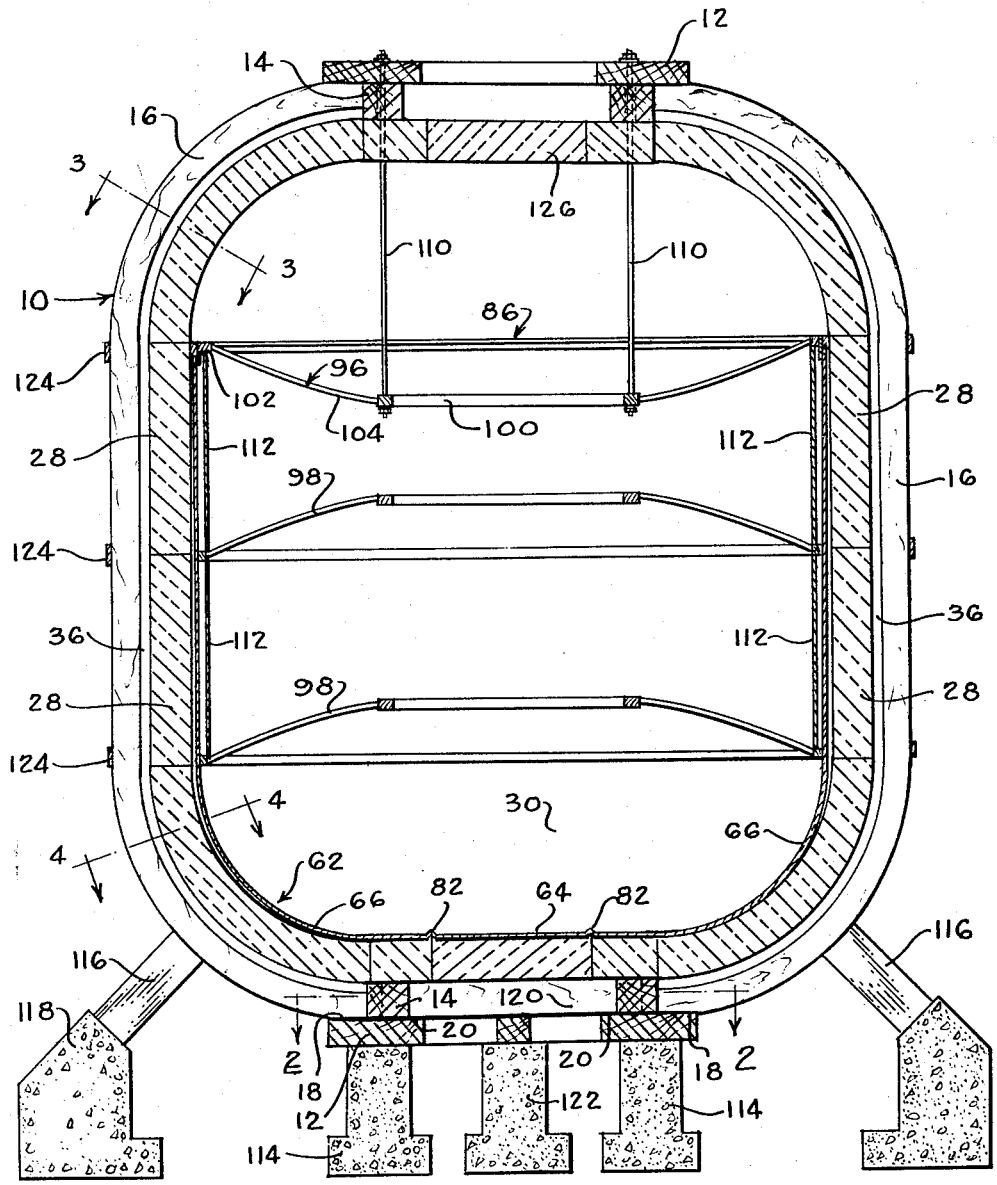
Figure 1 is a vertical sectional view through a vessel constructed in accordance with this invention.

Referring to the drawings in detail, and particularly Fig. 1, reference character 10 generally designates a vessel constructed in accordance with this invention which includes a base ring 12 preferably formed out of laminated wood which will provide the required structural strength and an extended service life and yet will have a relatively light weight. An identical ring 12 is preferably provided at the top of the vessel 10 for purposes which will be hereinafter set forth. Two additional rings 14 are disposed on the top of the bottom ring 12 and on the bottom face of the upper ring 12 for connection with arcuate, vertically extending ribs 16 to form the frame for the vessel 10. It will be observed that each ring 14 has a larger inner diameter than each ring 12 and a smaller outer diameter than each ring 12, such that the lower ring 14 may rest on the lower base ring 12, with a portion 18 of the base ring 12 protruding beyond the outer diameter of the lower ring 14 and a portion 20 of the base ring 12 protruding inwardly from the inner periphery of the lower ring 14.

The rings 14 are also preferably formed out of laminated wood, and as illustrated in Fig. 2, each of the rings 14 has a plurality of dovetailed shaped, vertical grooves 22 in the outer periphery thereof spaced circumferentially around the ring. Each of the grooves 22 receives the similarly shaped end portion 24 of one of the ribs 16. It will therefore be observed that the ribs 16 will be arranged in circumferentially spaced relation around the periphery of the vessel 10 and that the ribs 16 are connected at their upper and lower ends to the upper and lower rings 14, respectively. It should also be noted that the rings 12 are identical, the rings 14 are identical, and the ribs 16 are identical to facilitate erection of the frame of the vessel 10.

The ribs 16 are also preferably formed out of laminated wood and may be curved lengthwise in any desired fashion to provide a great variety of different shapes for the vessel 10. As shown in Fig. 2, each end of each rib 16 is also secured to the respective ring 12 by a pair of bolts 26 to provide additional strength for the frame of the vessel and to retain the rings 14 in the desired positions with respect to the rings 12. It will also be noted that each end portion of each rib 16 rests on the shoulder portion 18 of the respective ring 12 to provide additional vertical support for the frame.

A plurality of insulation panels 28 (Fig. 1) are secured in side-by-side and end-to-end relation around the inner periphery of the frame of the vessel 10 to form a closed storage chamber 30 having a configuration conforming with the configuration of the frame of the vessel. The panels 28 (see Fig. 3) are preferably formed out of wood, with inner and outer faces 31 and 32 of plywood sheets formed of hard wood, and with a relatively thick section 34 between the sheets 31 and 32 formed of a low-density, structurally strong, and dimensionally stable insulation material, such as balsa wood, quippo wood, or a honeycomb construction formed of paper or corrugated veneer. The sheets 31 and 32 are suitably bonded to the insulation layer 34. With this construction the walls of the storage chamber 30 will retain their shape through repeated temperature changes, and the insulation forming the chamber 30, in combination with the framework previously described, will provide a self-supporting vessel, whereby support around the inner surface of the insulation will not be required.

As also shown in Fig. 3, the panels 28 are attached to the ribs 16 by use of planks 36 suitably secured to the inner edges of the ribs 16 by fasteners 38, such as bolts. A face plank 36 extends along the inner side of each rib 16, and the inner face 40 of each plank 36 is tapered to a somewhat V-shape to receive the mating ends of a pair of the panels 28 extending at an acute angle from one another. Each end of each panel 28 is secured to one of the face planks 36 by a bolt 42 extending through the face plank and the outer hardwood facing 31 of the respective panel 28. A conically shaped core 44 is cut from the inner face of each panel 28 to provide access to the inner head of the respective bolt 42 for assembly and replacement of the insulating panels. Each conical core 44 is, of course, driven into place after the respective bolt 42 is secured to provide a substantially continuous insulation around the storage chamber.

Although the wooden construction of the insulation panels 28 will minimize contraction and expansion of the insulating panels, at least a limited amount of relative movement between the panels 28 does occur when the temperature in the storage chamber is changed to a large degree. Therefore, I prefer to seal the mating edges of the panels 28 in the manner illustrated in Fig. 3. A tapered chamfer 46 is formed around the inner edge of each panel 28, such that when two of the panels 28 are in abutting relation in the manner illustrated in Fig. 3, the mating chamfers 46 form a substantially V-shaped groove to receive a sealing strip 48. The opposite faces of the strip 48 are sealed, as by cementing, to the outer edge portions of the respective chamfers 46 to retain the strip 48 in the desired position and minimize the possibility of gas and liquid escaping around the strip 48. A flexible expansion or sealing plate 50 of metal, plastics or wooden veneer extends over the inner face of the strip 48 and is sealed at its opposite edges to the inner faces of the adjacent panels 28 by the use of a suitable cement or the like. A corrugation or bulbous portion 52 is formed in the central portion of the plate 50 to facilitate lateral contraction and expansion of the sealing plate 50 with movements of the respective panels 28. A mating groove 54 is formed in the inner face of the strip 48 to loosely receive the corrugation 52, such that the strip 48 will not interfere with movements of the plate 50. Also, a slit 56 is cut part way through the strip 48 from the base of the groove 54 to facilitate lateral expansion and contraction of the strip 48 upon relative movements between the ends of the respective panels 28.

Since the outer face of each panel 28 is exposed to ambient temperature, substantially all of the expansion and contraction encountered will be near the inner face of the panel. However, I prefer to provide mating grooves 58 in the adjacent faces of abutting panels 28 outwardly of the chamfers 46 to receive a suitable sealing strip, such as a strip of rubber 60, to further assure that leakage and convection currents will be blocked between the abutting faces of the panels.

A relatively thin lining 62 is disposed in the storage chamber 30, as shown in Fig. 1, and extends loosely over the bottom of the chamber and up the sides of the chamber to above the level of cold liquid stored in the vessel 10. It will therefore be observed that the lining or envelope 62 is open at the top and has a substantially U-shape in cross section. The lining 62 is formed out of a material which is impervious to gas and liquid and is preferably made sufficiently thin as to not be self-supporting. I prefer to form the lining 62 to include a substantially round bottom plate 64, both of which may be fabricated of a metal, such as aluminum, alloy of aluminum, copper, stainless steel or other austenitic steel, and with sheets of the metal secured around the periphery of the plate 64 and extending upwardly along the inner periphery of the insulating panels 28. Instead, it can be formed of a continuous film of synthetic resinous polymer, such as polyethylene, polytetrafluoroethylene, or of film glass.

The adjacent sheets 66 forming the side walls of the lining 62 are preferably interconnected as illustrated in Fig. 4. The edge portion 68 of one sheet 66 is turned inwardly into the chamber 30. The mating edge 70 of an adjacent sheet 66 is also turned inwardly and then lapped over the inturned portion 68 of the other sheet. The end portions 68 and 70 are then suitably welded or brazed or cup jointed, with or without the use of a sealant, to provide a gas and liquid-tight connection between the adjacent sheets. This type of construction provides a plurality of circumferentially spaced vertical corrugations, as designated generally by reference character 72, around the periphery of the lining 62 to accommodate circumferential expansion and contraction of the lining. It will be apparent that since the lining 62 is not bonded to the insulating panels 28, the lining 62 will contract and expand independently of the insulation and, when the lining 62 is formed out of aluminum or stainless steel, the lining will contract and expand to a greater extent than the inner faces of the insulating panels 28 during temperature changes in the storage chamber 30. These vertically extending corrugations 72 permit substantial circumferential expansion and contraction of the lining 62 without rupture of the lining. A retaining strip or key 74, preferably formed out of a wood such as balsa wood, is wedged into a tapered groove 76 extending vertically through the inner faces of the panels 28 opposite each of the corrugations 72. Each key 74 extends inwardly into the chamber 30 into the respective corrugations 72 to prevent turning or circumferential creeping of the lining 62 in the chamber 30 when the lining is repeatedly expanded and contracted. It will be noted that the keys 74 are not bonded to the lining 62, such that expansion and contraction of the corrugations 72 will not be impeded.

The lower end of each sheet 66 is preferably secured to the outer periphery of the plate 64 in the manner illustrated in Fig. 5. The lower end 78 of each sheet 66 is turned upwardly and the outer peripheral portion 80 of the plate 64 is turned upwardly at an opposed angle to the ends 78, with the extreme outer edge of the plate 64 being bent downwardly in overlapping relation with the ends 78 of the sheets 66. The ends 78 and the portion 80 of the plate 64 are then suitably welded or brazed to provide a gas and liquid-tight connection of the sheets 66 to the plate 64. This construction also provides a circumferential corrugation, generally designated by reference character 82, around the outer edge of the plate 64 forming the bottom of the lining 62. The corrugation 82 permits radial expansion and contraction of the plate 64 and also accommodates at least some of the vertical expansion and contraction of the sheets 66 to prevent rupture of the lining 62. The corrugations 72 extending vertically at the connection of adjacent sheets 66 are suitably welded to the circumferential corrugation 82 to complete the connection of the sheets 66 to the plate 64.

It may also be noted that additional circumferential corrugations are desirably formed in the plate 64 inwardly of the corrugation 82 when the vessel 10 is constructed of substantial size to assure that the plate 64 may expand and contract radially without damage. A key 83 is wedged into a mating tapered groove 84 in the insulation panels 28 extending across the bottom of the storage chamber 30 to extend into the corrugation 82 and prevent creeping of the plate 64 to retain the lining 62 centered in the storage chamber 30. The key 83 in the bottom of the vessel 10 will, of course, be extended in a circular path to conform with the contour of the corrugation 82.

Figure 6:
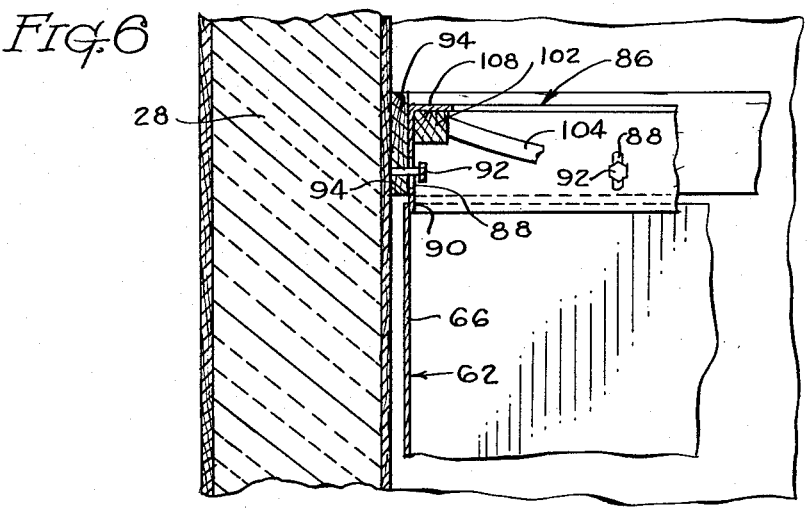
Figure 6 is an enlarged detailed sectional view taken through the upper end portion of the lining shown in the vessel in Fig. 1 to more clearly illustrate the details of construction.

The upper ends of the sheets 66 (see Fig. 6) defining the upper end of the lining 62 are secured, as by welding, to an angle or L-shaped member generally designated by reference character 86. The angle 86 is preferably formed out of stainless steel or aluminum and is of sufficient thickness to be substantially stronger than the sheets 66. A plurality of vertically extending and circumferentially spaced slots 88 are formed in the vertical flange 90 of the angle 86 to loosely receive bolts 92 extending radially inward from a block or strip 94 extending around the inner periphery of the storage chamber 30. The strip 94 is preferably formed out of a hard wood and is suitably bonded to the respective insulation panel 28 to provide a rigid support for the bolts 92. The bolts 92 are provided to form what may be considered a second line of defense for engaging the upper ends of the slots 88 in the event the lining 62 tends to collapse upon the failure of the normal supporting means for the lining, which will be described in detail below. However, the slots 88 are of sufficient lengths that the angle 86 may move up and down over the bolts 92 during normal expansion and contraction of the lining 62.

Figure 7:
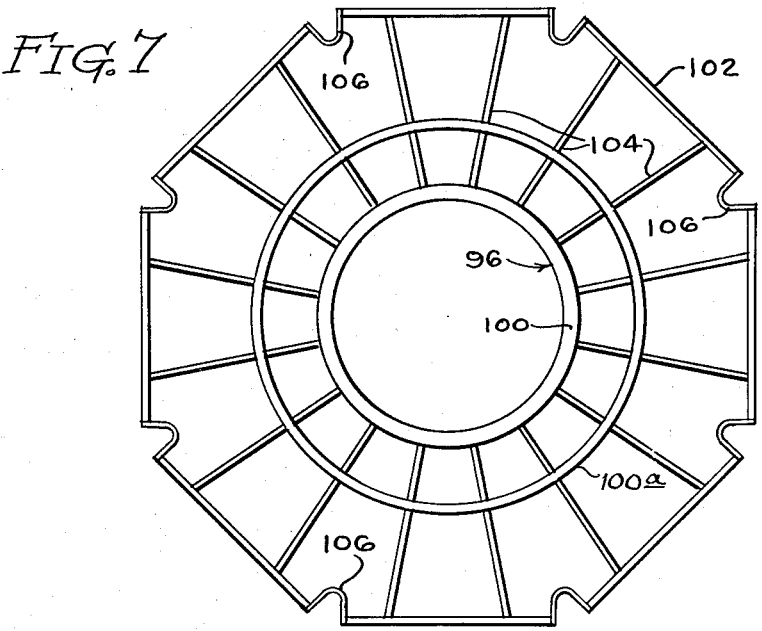
Figure 7 is a typical plan view of a spider used in the vessel for preventing collapse of the lining.

The lining 62 (Fig. 1) is normally prevented from collapsing by an upper spider 96 and two lower spiders 98, as illustrated in Fig. 1. The upper spider 96 is preferably formed out of wood to incur a minimum of expansion and contraction upon exposure to substantial temperature changes and comprises (see Fig. 7) spaced inner rings 100 and 100ª connected to an outer ring 102 by a plurality of radially extending arms 104. The outer ring 102 is made in straight lengths of wood interconnected by U-shaped wood springs 106, such that the diameter of the outer ring 102 may be varied to accommodate expansion and contraction of the angle 86 at the upper end of the lining 62. The outer ring 102 extends underneath the top flange 108 (Fig. 6) of the angle 86 to provide a lifting force on the upper end of the lining 62, as will be described.

The inner ring 100 (Fig. 1) of the spider 96 is secured by a plurality of cables 110 extending downwardly in the storage chamber 30 from the upper rings 12 and 14. It may also be noted that the cables 110 are extended through mating apertures in the respective insulation panels 28, but the fit of the cables 110 in such apertures may be sufficiently tight as to not destroy the insulating effect of the respective insulation panels. The lower ends of the cables 110 are suitably connected to the inner ring 100 of the upper spider 96 to prevent the ring 100 from moving downward in the chamber 30. It is preferred that the cables 110 be formed out of stainless steel or the like to minimize expansion and contraction thereof. The arms 104 of the spider 96 are curved downwardly and inwardly from the outer ring 102 to the inner ring 100 and, being wood, may be bent upon the application of an appreciable force.

When the lining 62 contracts, the upper flange 108 of the angle 86 will force downwardly on the outer ring 102 of the spider 96 and slightly bend the arms 104. This movement merely increases the radially outward force imposed by the arms 104 on the flange portion 90 of the angle 86 to further assure that the upper portion of the lining 62 will not collapse and fall inwardly in the chamber 30. As the lining 62 is warmed and expanded, the arms 104 will cause the outer ring 102 to move upwardly and remain in engagement with the angle 86 to prevent collapse of the upper portion of the lining when the chamber 30 is emptied of the cold liquid.

The lower spiders 98 are constructed in the same manner as the upper spider 96, except that the arms of the lower spiders 98 are bent outwardly and downwardly from the inner to the outer rings. Also, the materials of construction of the spiders 98 must be such that the spiders 98 will have a density greater than the liquid being stored. The spiders 98 will therefore tend to fall in the cold liquid stored in the chamber 30 and continuously urge the outer rings of the spiders 98 into contact with the walls of the lining 62. The outer rings of the spiders 98 are prevented from downward movement by suitable cables 112 extending downwardly from the angle 86 to retain the spiders 98 in the desired positions in the chamber 30 and assure that these spiders will continuously urge the medial portions of the walls of the lining 62 outwardly, which in turn insures that the lining 62 will not collapse.

As previously indicated, the vessel 10 may be used to store a cold liquid in a given locality, such as near a natural gas liquefaction system, or the vessel 10 may be used to transport a cold liquid, such as aboard a ship. In a stationary installation, the lower base ring 12 may be adequately supported on footings 114, as illustrated in Fig. 1, to bear the major portion of the weight of the vessel and the liquid stored in the vessel. Additional supports may be provided by wood knees 116 extending upwardly from footings 118 into engagement with the ribs 16. The knees 116 add stability to the vessel 10 and assure that the vessel will not be tipped over or blown over by a high wind. When the vessel 10 is of appreciable size, I also prefer to extend a plurality of cross braces 120 across the lower ring 14 to support the panels 28 in the lower central portion of the vessel. The opposite ends of the braces 120 rest on the exposed portions 20 of the base ring 12 to support the insulation panels 20 by the base ring. Additional footings 122 may be positioned under the braces 120 as required to provide adequate support. I also prefer to secure a plurality of metal retaining bands 124 around the ribs 16 in vertically spaced relation to retain the ribs 16 in their desired circumferential relation and provide additional radial strength for the vessel 10. The bands 124 may be formed out of any desired metal, such as steel, which has substantial tensile strength.

When using the vessel 10 to transport a cold liquid, the vessel is secured in the transporting ship or the like (not shown) in any desired manner by use of the base ring 12 and anchors connected to the vertically extending ribs 16.

As previously indicated, the vessel 10 is particularly useful in storing liquefied natural gas. It will be apparent that at least a minor amount of heat will pass through the insulating panels 28 and provide a constant evaporation of the liquefied natural gas in the chamber 30. Therefore, suitable relief valves (not shown) will normally be installed in the insulation panels 28 above the normal liquid level to prevent a gradual increase of the pressure in the chamber 30 and retain the pressure in the chamber 30 at only slightly above atmospheric. However, in the event a portion of the insulation 28 fails, or an appreciable amount of heat in some unexplained manner reaches the liquefied natural gas, the pressure in the chamber 30 will increase suddenly and the normal relief valves will not be adequate to alleviate the excessive pressure. Therefore, I prefer to cut a tapered core 126 in one of the uppermost insulation panels 28 in vertical alignment with the opening through the upper ring 14. The core 126 has tapered sides to mate a tapered hole in the respective insulation panel 28, such that the plug 126 will normally be wedged in place to complete the insulation of the upper portion of the chamber 30. When an excessive pressure develops in the chamber 30, the plug 126 will be blown upwardly through the upper rings 14 and 12 to prevent damage to the vessel 10. As soon as the excessive pressure is relieved, the plug 126 may be replaced.

While the description refers to a land or ship storage tank of curvilinear section, it should be understood that the concepts described can be formed to other shapes, such as tanks of square, rectangular or other polygonal shapes in horizontal or vertical cross section.

From the foregoing it will be apparent that the present invention provides a novel vessel for storing cold liquids, wherein the vessel is light weight and may be economically constructed. The interchangeability, particularly in the framework of the vessel, facilitates erection of the vessel in a remote locality, such that the various parts may be transported in the most economical manner and then assembled at the point of use. The separate lining or envelope effectively contains the cold liquid out of direct contact with the insulation surrounding the storage chamber and prevents the imposition of damaging expansion and contraction of the insulation. It will also be apparent that the present invention provides a novel supporting means for retaining the thin lining in the desired position in the storage chamber to prevent collapse of the lining and prevent damage of the lining during substantial temperature changes in the storage chamber. The wooden spiders used for retaining the lining in position in the storage chamber effectively perform their desired function, without materially subtracting from the available storage space.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. In a vessel for storing cold liquids, a pair of horizontally disposed, vertically spaced and vertically aligned wooden rings; a plurality of vertically extending outwardly bowed wooden ribs extending continuously from the outer periphery of one ring to the outer periphery of the other and connected at their upper and lower ends to said rings and arranged in circumferentially spaced relation to define, with said rings, a supporting frame for the vessel; wooden insulation panels secured around the inner periphery of the frame in side-by-side and end-to-end relation to define a storage chamber; and a gas and liquid-impervious material lining incapable of self-sufficiency extending loosely over the bottom of the storage chamber and up around the inner periphery of the walls of the storage chamber to above the normal liquid level to receive the liquid being stored, said insulating lining resting against the insulation panels for support, when liquid is stored therein, and means for supporting the lining against collapse in the storage chamber.

2. A vessel as defined in claim 1 characterized further in that each of said ribs is dovetailed at its opposite ends in said rings, and said rings are of the same size and construction.

3. A vessel as defined in claim 1 characterized further in that an explosion plug is formed in an insulation panel extending under the uppermost ring in a position to move upwardly through the uppermost ring upon the occurrence of an explosive pressure in the storage chamber.

4. A vessel as defined in claim 1 characterized further in that each insulation panel comprises a layer of insulating wood and hard-wood layers bonded on the inner and outer faces of the insulating wood and expansion joints interconnecting the insulation panels to provide a continuous barrier to the penetration of liquid.

5. In a vessel for storing cold liquids, a pair of horizontally disposed, vertically spaced apart and vertically aligned wooden rings; a plurality of vertically extending, outwardly bowed ribs extending continuously from the outer periphery of one ring to the outer periphery of the other and attached thereto, said ribs being arranged in uniformly circumferentially spaced apart relation to define, with said rings, a supporting frame for the vessel, wooden insulation panels secured around the inner periphery of the frame in side-by-side and in end-to-end relation to define a storage chamber, a gas and liquid impervious lining incapable of self-sufficiency extending loosely over the bottom of the storage chamber and upwardly around the inner periphery of the walls of the storage chamber to above the normal liquid level to receive the liquid being stored and means for supporting the lining which includes a wooden spider connected to the upper end portion of the lining and extending inwardly and downwardly in the storage chamber from the upper end portion of the lining, and means for supporting the central portion of the spider against downward movement in the storage chamber.

6. A vessel as defined in claim 5 characterized further in that the means for supporting the central portion of the spider comprises a plurality of cables suspended from the uppermost ring of the frame and connected to the central portion of the spider.

7. In a vessel for storing cold liquids and having an insulated storage chamber, the improvement which comprises a non-selfsupporting gas and liquid-impervious material lining extending loosely over the bottom and around the inner periphery of the walls of the storage chamber up to above the normal liquid level in the storage chamber to receive the liquid to be stored, a wooden spider engaging the upper end portion of the lining and extending inwardly and downwardly into the storage chamber, and means for supporting the central portion of the spider against downward movement in the storage chamber, whereby the spider provides a lifting and radially outward force on the upper end portion of the lining to prevent collapse of the lining.

8. A vessel as defined in claim 7 characterized further to include an angle member secured around the upper end of the lining and having a horizontally extending flange portion, and wherein said spider comprises inner and outer rings and radial arms interconnecting the rings, said arms being extended upwardly from the inner ring to the outer ring, and said outer ring being engaged with the bottom face of the horizontally extending flange portion of the angle member.

9. A vessel as defined in claim 8 characterized further to include springs in said outer ring for varying the diameter of said outer ring upon contraction and expansion of the angle member.

10. A vessel as defined in claim 7 characterized further to include a second wooden spider positioned in the storage chamber below the first-mentioned spider, said second spider comprising inner and outer rings and radial arms interconnecting said rings, said arms extending downwardly and outwardly from the inner to the outer ring, means supporting said outer ring against downward movement in the lining, and said second spider having a density greater than the density of the liquid stored in the vessel to tend to move the inner ring down by gravity and urge said outer ring against the lining for preventing collapse of a medial portion of the lining.

11. A vessel as defined in claim 7 characterized further in that the lining comprises a metal plate forming the bottom of the lining, a plurality of metal sheets secured by a gas and liquid-tight connection at their lower ends to the outer edge of the plate and extending upwardly from the plate to form the walls of the lining, the adjacent edge portions of said sheets being turned inwardly and sealed in gas and liquid-tight engagement to form vertically extending corrugations and accommodate circumferential expansion and contraction of the lining.

12. A vessel as defined in claim 11 characterized further to include keys embedded in the walls of the storage chamber and extending into said corrugations to prevent turning of the lining in the storage chamber.

13. A vessel as defined in claim 11 characterized further in that the connecting edge portions of said plate and said sheets are turned upwardly to form a circumferential corrugation around said plate and accommodate radial expansion and contraction of said plate, along with at least a portion of the vertical expansion and contraction of said sheets.

14. A vessel as defined in claim 13 characterized further to include a key embedded in the bottom of the storage chamber and extending into said circumferential corrugation to maintain the lower end portion of the lining centered in the storage chamber.

References Cited in the file of this patent

UNITED STATES PATENTS

| | | |
|---|---|---|
| 1,799,234 | Huff | Apr. 7, 1931 |
| 1,864,606 | McBride | June 28, 1932 |
| 1,979,221 | Dana | Oct. 30, 1934 |
| 2,329,765 | Jackson et al. | Sept. 21, 1943 |
| 2,563,118 | Jackson | Aug. 7, 1951 |
| 2,800,249 | Beckwith | July 23, 1957 |